US00RE43451E

(19) United States
(12) Reissued Patent
Nakada

(10) Patent Number: US RE43,451 E
(45) Date of Reissued Patent: Jun. 5, 2012

(54) RADIO BASE STATION DEVICE SETTING SYSTEM AND METHOD FOR RE-SETTING COMMUNICATION CONFIGURATIONS FOR RADIO BASE STATION DEVICE

(75) Inventor: Suguru Nakada, Tokyo (JP)

(73) Assignee: NEC Corporation, Tokyo (JP)

(21) Appl. No.: 12/716,349

(22) Filed: Mar. 3, 2010

Related U.S. Patent Documents

Reissue of:
(64) Patent No.: 7,340,278
Issued: Mar. 4, 2008
Appl. No.: 11/120,618
Filed: May 3, 2005

(30) Foreign Application Priority Data

May 12, 2004 (JP) ..... 2004-142303

(51) Int. Cl.
*H04B 1/38* (2006.01)

(52) U.S. Cl. ..... 455/561; 455/423; 455/456.1; 455/41.1

(58) Field of Classification Search ..... 455/561, 455/456.1, 41.1, 41.2, 423, 424, 446, 456.5, 455/560, 422.1, 67.11, 69
See application file for complete search history.

(56) References Cited

U.S. PATENT DOCUMENTS

| | | | | |
|---|---|---|---|---|
| 6,128,288 | A | 10/2000 | Miya | |
| 6,622,020 | B1 * | 9/2003 | Seki | 455/561 |
| 6,829,484 | B1 * | 12/2004 | Kimoto et al. | 455/456.1 |
| 7,110,775 | B2 * | 9/2006 | Ogino et al. | 455/456.1 |
| 7,120,417 | B2 * | 10/2006 | Shoki et al. | 455/456.1 |
| 2002/0021231 | A1 * | 2/2002 | Schlager et al. | 340/984 |
| 2002/0024939 | A1 | 2/2002 | Silventoinen et al. | |
| 2008/0167049 | A1 * | 7/2008 | Karr et al. | 455/456.2 |

FOREIGN PATENT DOCUMENTS

| | | |
|---|---|---|
| JP | 09-008827 | 1/1997 |
| JP | 09-08827 | 1/1997 |
| JP | H9-322240 | 12/1997 |
| JP | 2000-197129 | 7/2000 |
| JP | 2000-197129 A | 7/2000 |
| JP | 2000-341757 | 12/2000 |
| JP | 2000-358273 | 12/2000 |
| JP | 2001-320754 | 11/2001 |

(Continued)

OTHER PUBLICATIONS

Japanese Office Action dated Aug. 5, 2009.
German Official Action dated Jul. 8, 2011 together with an English language translation from related application DE 10 2005 021 531.9.

*Primary Examiner* — John J Lee
(74) *Attorney, Agent, or Firm* — Scully, Scott, Murphy & Presser, P.C.

(57) ABSTRACT

When an information storage unit of a radio base station setting device includes information related to a CDMA radio base station device which has supplied discrimination information, the radio base station setting device deletes the information from the information storage unit, and estimates the location of the CDMA radio base station device. The radio base station setting device reads communication configurations for existing radio base station devices installed around the estimated location from the information storage unit. The radio base station setting device determines communication configurations for the CDMA radio base station device based on the read communication configurations for the existing radio base station devices, and the estimated location.

14 Claims, 5 Drawing Sheets

FOREIGN PATENT DOCUMENTS

| | | |
|---|---|---|
| JP | 2002-101468 | 4/2002 |
| JP | 2002-217918 | 8/2002 |
| JP | 2002-345015 | 11/2002 |
| JP | 2002-354524 | 12/2002 |
| JP | 2003-143654 | 5/2003 |
| JP | 2003-153337 | 5/2003 |
| JP | 2003-319445 | 11/2003 |
| WO | WO 02/07467 A1 | 1/2002 |

* cited by examiner

RADIO BASE STATION DEVICE SETTING SYSTEM AND METHOD FOR RE-SETTING COMMUNICATION CONFIGURATIONS FOR RADIO BASE STATION DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a radio base station device setting system and method.

2. Description of the Related Art

Conventionally, there has been known a mobile telephone network that employs mobile telephone terminal devices (see JP-2000-197129-A).

Recently, mobile telephone networks have been making remarkable extension. For example, mobile telephone radio base station device have been installed in population areas, buildings, subway yards, and even in the mountains where only roads have been constructed but no people seem to live. Such installation of base station devices may lead to an environment in which mobile telephone terminal devices can be connected to any mobile telephone network.

The expansion of mobile telephone networks has been encouraged by requests made by users for the expansion of mobile telephone networks. Further, the expansion of mobile telephone networks has been promoted by the reduced size and cost of radio base station devices.

However, even if a plurality of radio base station devices were installed everywhere outdoors, areas, which can be covered by these radio base station devices, are limited. Thus, complete solutions have not been found for the problem that a mobile telephone terminal device experiences difficulty in connecting to a mobile telephone network in a particular room. Currently, a need exists for a family-use compact radio base station device that solves this problem.

JP-9-8827-A describes a small mobile base station that can be used as a family-use compact radio base station device.

However, there are several problems that must be overcome in order to realize family-use compact radio base station devices. For example, one problem is found in a method of setting communication configurations for each family-use compact radio base station device. This problem will be described below in detail.

Currently, when a radio base station device for mobile telephones is installed, its communication configurations are determined by considering the entire mobile telephone network. Specifically, the communication configurations indicate the radius of a cell formed by the radio base station device (area covered thereby) and a frequency used thereby, and in a CDMA (Code Division Multiple Access) system, a spreading code sequence that is used by the radio base station device. Subsequently, the determined communication configurations are set in the radio base station device to be installed. The communication configurations, which are set in the radio base station device, will not be basically modified unless the mobile telephone network is revised.

Therefore, once communication configurations have been set in a family-use compact radio base station device, the user cannot modify the communication configurations, according to his/her own wishes.

Also, because communication configurations for a radio base station device are basically not modified, movement of a family-use compact radio base station device may cause, for example, interference of radio waves between radio base station devices.

Thus, any movement of a family-use compact radio base station device can cause failure of the normal functions of a mobile telephone network. Therefore, the user is not allowed to freely move a family-use compact radio base station device from the location at which the carrier installed the device. The family-use compact radio base station device is therefore inconvenient for the user when the user moves it, rearranges rooms, and cleans the house.

SUMMARY OF THE INVENTION

It is an object of the present invention to provide a radio base station device setting system and method that offer a radio base station device that a user can easily use.

To achieve the above object, a radio base station device setting system according to the present invention includes a radio base station device, and a radio base station setting device for setting communication configurations for the radio base station device.

The radio base station setting device includes an information storage unit for storing identification information for identifying each of the existing radio base station devices, the locations of the existing radio base station devices, and communication configurations for the existing radio base station devices in association with one another per the existing radio base station device.

The booting or updating radio base station device, relying on a radio signal transmitted from another radio base station device, detects identification information that indicates the other radio base station device and the distance information that indicates the distance from the other radio base station device to the radio base station device itself.

The booting or updating radio base station device supplies the radio base station setting device with the detected identification information and the distance information together with the discrimination information thereof.

When identification information, which identifies a radio base station device indicated by the supplied discrimination information, is stored in the information storage unit, the radio base station setting device deletes the identification information from the information storage unit, as well as the location of and communication configurations for the radio base station device stored in the information storage unit in association with the identification information.

In other words, the radio base station setting device deletes the identification information, the location of and communication configurations for the booting or updating radio base station.

The radio base station setting device estimates the location of the booting or updating radio base station device based on the location of the existing base station device (i.e., the other radio base station device) stored in the information storage unit in association with the supplied identification information, and the supplied distance information.

The radio base station setting device reads from the information storage unit communication configurations for existing radio base stations installed around the estimated location.

The radio base station setting device determines new communication configurations for the booting or updating radio base station device based on the read communication configurations for other radio base stations and the estimated location.

The radio base station setting device stores the determined communication configurations in the information storage unit, and supplies the determined communication configurations to the booting or updating radio base station device.

The booting or updating radio base station device sets the supplied communication configurations in the device itself.

Thus, each time a radio base station device supplies the radio base station setting device with identification information of neighboring radio base station devices, distance information, and discrimination information, the radio base station setting device can automatically set communication configurations for the radio base station device so as not to disable radio communications of other radio base station devices.

Accordingly, for example, even if the user moves the radio base station device, the radio base station device can operate in accordance with communication configurations suitable for the location to which it has been moved.

The radio base station setting system is preferably implemented in the following manner.

The other radio base station device transmits transmission data spread by a spreading code sequence, as the radio signal. The radio base station device setting system further includes a radio base station controller for supplying the booting or updating radio base station device with the frequency of radio signal and the spreading code sequence used by the other radio base station device. The booting or updating radio base station device detects the spreading code sequence of the radio signal from the transmitted radio signal, as the identification information, and detects the level of the received signal and the reception timing of the radio signal, as the distance information.

In the mobile communication system which uses transmission data spread by the spreading code sequence as a radio signal, according to the implementation described above, each time the radio base station device supplies the radio base station setting device with identification information of neighboring radio base station devices, distance information, and discrimination information, the radio base station setting device can automatically set communication configurations for the radio base station so as not to disable radio communications of other radio base station devices.

Also, the radio base station device setting system of the present invention is preferably implemented in the following manner.

The radio base station device accepts user preference information from a user, which indicates the desired communication configurations for the radio base station device, and supplies the radio base station setting device with the accepted user preference information. The radio base station setting device determines the communication configurations for the radio base station device based on the read communication configurations for the existing radio base station device, the estimated location, and the user preference information.

According to the implementation described above, the communication configurations for the radio base station device are determined based on communication configurations for existing radio base station devices installed around the radio base station device, the location of the radio base station device, and the user preference information. It is therefore possible to automatically set the communication configurations for the radio base station device in accordance with the user's request.

Accordingly, the radio base station device can operate in accordance with the communication configurations that reflect settings desired by the user.

Further, the radio base station device setting system of the present invention is preferably implemented in the following manner.

The radio base station device supplies the radio base station setting device with capability information that indicates its communication processing capabilities. The radio base station setting device determines communication configurations for the radio base station device based on the read communication configurations of the existing radio base station devices, the estimated location, and the capability information.

According to the implementation described above, the communication configurations for the radio base station device are determined based on the communication configurations of existing radio base station devices installed around the radio base station devices, the location of the radio base station device, and the communication processing capabilities of the radio base station device. It is therefore possible to automatically set the communication configurations for the radio base station device in accordance with the communication processing capabilities of the radio base station device so as not to disable radio communications of other radio base station devices.

Further, the radio base station device setting system is preferably implemented in the following manner.

The radio base station setting device determines communication configurations for the radio base station based on the read communication configurations of the existing radio base station devices, estimated location, user preference information, and capability information.

According to the implementation described above, the communication configurations for the radio base station device is determined based on the communication configurations for the existing radio base station devices installed around the radio base station devices, the location of the radio base station device, user preference information, and communication capabilities of the radio base station device. It is therefore possible to automatically set the communication configurations for the radio base station device in accordance with the communication processing capabilities of the radio base station device and the user's request so as not to disable radio communications of other radio base station devices.

Further, the radio base station device setting system of the present invention is preferably implemented in the following manner.

The radio base station device acquires positional information that indicates a current position provided by GPS satellites, and supplies the acquired positional information to the radio base station setting device. The radio base station setting device estimates the location of the radio base station device based on the location of an existing radio base station device stored in the information storage unit in association with the supplied identification information, the supplied distance information, and the supplied positional information.

According to the invention described above, the location of the radio base station device is estimated based on the location of the existing radio base station device stored in the information storage unit in association with the identification information, the distance information, and the positional information. Thus, the location of the radio base station device can be estimated with a high accuracy. It is therefore possible, with a high degree of probability, to automatically set the communication configurations for the radio base station device so as not to disable radio communications of other radio base station devices.

According to the present invention, when information (identification information, location, and communication configurations) related to a radio base station device, which has supplied discrimination information, is stored in the information storage unit, the radio base station setting device deletes the information from the information storage unit, and estimates the location of the radio base station device. The radio base station setting device reads from the information storage unit communication configurations for existing radio base station devices installed around the estimated location. The radio base station setting device determines communication configurations for the radio base station device based on the read communication configurations for existing radio base station devices and the estimated location.

With the foregoing process, each time a radio base station device supplies the radio base station setting device with identification information, distance information, and discrimination information, the radio base station setting device can automatically set communication configurations for the radio base station device so as not to disable radio communications of other radio base stations.

Consequently, for example, even if the user moves a radio base station device, the radio base station device can operate in accordance with communication configurations suitable for a location to which it is moved.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
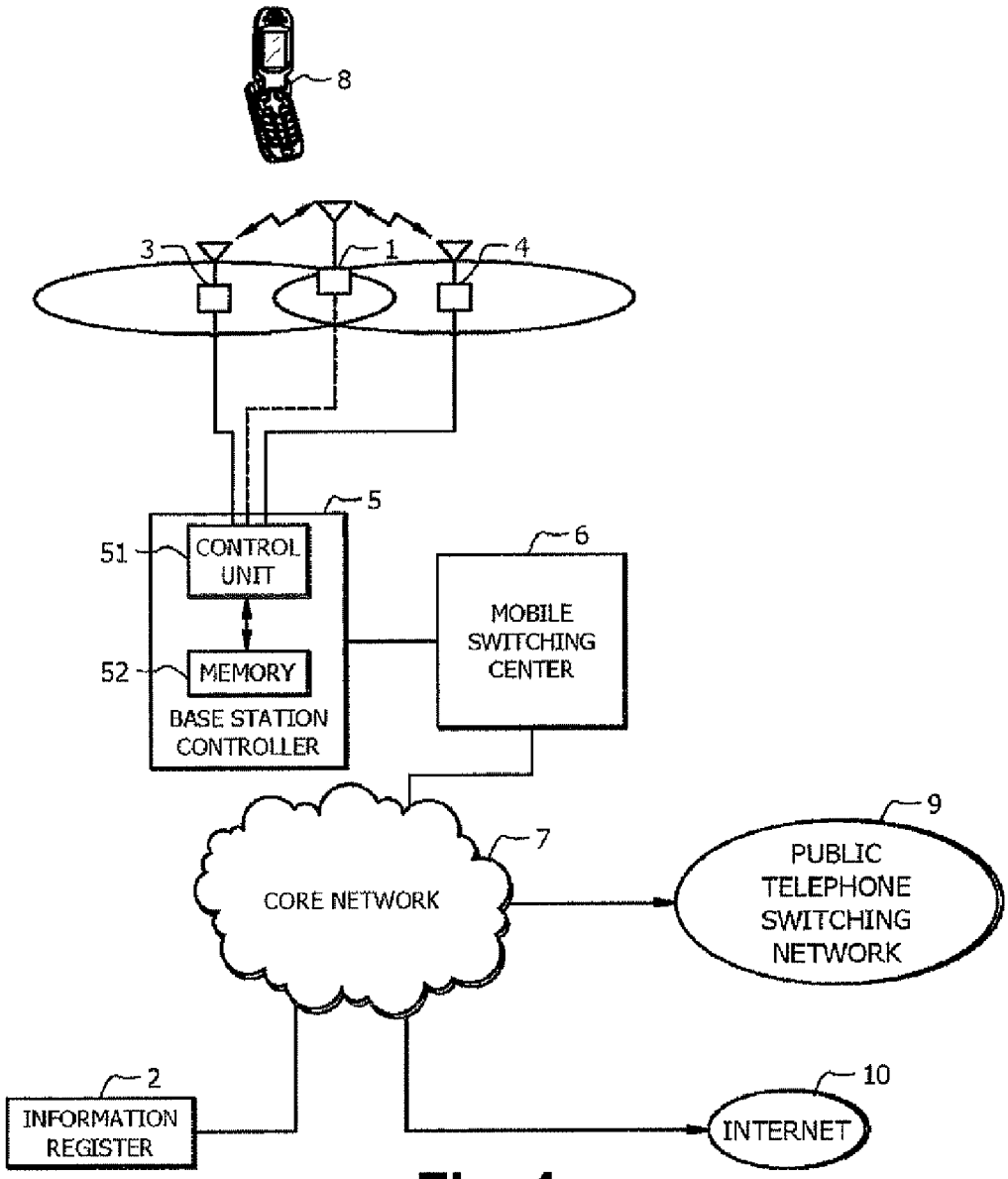
FIG. 1 is a block diagram illustrating a radio base station device setting system in one embodiment of the present invention.

In an embodiment illustrated in FIG. 1, the present invention is applied to a DS-CDMA (Direct Spread Code Division Multiple Access) mobile telephone system defined in 3GPP (The 3rd Generation Partnership Project), by way of example. However, the present invention is not limited to the DS-CDMA mobile telephone system, but may be applied to a mobile communication system that has radio base station devices.

Referring to FIG. 1, a radio base station device setting system comprises CDMA radio base station device (Node B) 1, and radio base station information register (NBIR: Node B Information Register) 2. Radio base station information register 2 is an example of radio base station setting device.

More specifically, the radio base station device setting system comprises CDMA radio base station device 1; radio base station information register 2; CDMA radio base station device (Node B) 3; CDMA radio base station device (Node B) 4; radio base station controller (RNC) 5; mobile switching center (MSC) 6; and core network (CN) 7. Three or more CDMA radio base station devices may be connected to radio base station controller 5.

Each of CDMA radio base station devices 3, 4 is a conventional CDMA radio base station device that is fixedly installed at a predetermined location. Each of CDMA radio base station devices 3, 4 communicates by wireless with mobile telephone terminal device 8 within its cell in accordance with the CDMA method.

Radio base station controller 5 comprises control unit 51 and memory 52. Control unit 51 is connected to CDMA radio base station devices 1, 3, 4, and mobile switching center 6. Memory 52 stores radio frequencies and spreading code sequences used by CDMA radio base station devices that are connected to control unit 51.

Control unit 51 controls the operation of radio base station controller 5. For example, control unit 51 directly controls communication operations of CDMA radio base station devices 1, 3 and 4. Control unit 51 receives from CDMA radio base station device 1 a connection notification message showing that CDMA radio base station device 1 is connected to radio base station controller 5. Upon receipt of the connection notification message, control unit 51 reads from memory 52 radio frequencies and spreading code sequences used by other CDMA radio base station devices that are connected to radio base station controller 5 (in this embodiment, CDMA radio base station devices 3 and 4). Control unit 51 generates a different radio base station device information notification message, which shows the read radio frequency and spreading code sequence. Control unit 51 supplies CDMA radio base station device 1 with the generated different radio base station device information notification message.

CDMA radio base station device 1 may be, for example, a family-use compact radio base station device that is installed in a general family. CDMA radio base station device 1 communicates by wireless with mobile telephone terminal device 8 within its cell in accordance with the CDMA method. CDMA radio base station device 1 is not limited to the family-use compact radio base station device installed in a general family, but may be changed as appropriate.

CDMA radio base station device 1, when connected to radio base station controller 5, supplies a connection notification message to radio base station controller 5. Also, CDMA radio base station device 1 receives the different radio base station device information notification message transmitted from radio base station controller 5.

Upon receipt of the different radio base station device information notification message, CDMA radio base station device 1 receives radio signals transmitted from CDMA radio base station devices 3 and 4, respectively, using the radio frequencies and spreading code sequences shown in the different radio base station device information notification message received thereby. Then, CDMA radio base station device 1 measures a received signal level (for example, received signal power level) of each of the radio signals received thereby, and the reception timing of each of the received radio signals. The received signal level and reception timing serve as distance information, which indicates the distance from a radio base station device that has transmitted the radio signal to CDMA radio base station device 1.

Specifically, the received signal level becomes lower as the CDMA radio base station device 1 is farther away from the radio base station device that has transmitted the radio signal. The reception timing, in turn, is delayed longer from a reference time (a time at which the radio signal was transmitted) as CDMA radio base station 1 is farther away from the radio base station device that has transmitted the radio signal.

CDMA radio base station device 1 captures the notification information and spreading code sequences that are included in these received radio signals using spreading code sequences shown in the different radio base station device information notification message. The notification information includes identification information for identifying a radio base station device, which has transmitted a radio signal that includes the notification information. Also, because a particular radio base station device uses a particular spreading code sequence, the spreading code sequence serves as identification information for identifying a radio base station device.

CDMA radio base station device 1 also accepts user preference information entered by the user. In this embodiment, the user preference information indicates a desired cell radius of and a desired number of terminals connected to CDMA radio base station device 1.

CDMA radio base station device 1 generates a setting request notification message which includes received signal information, user preference information, capability information that indicates the radio communication processing capabilities of CDMA radio base station device 1, and discrimination information for identifying CDMA radio base station device 1.

The received signal information indicates information acquired from the received radio signals. Specifically, the received signal information indicates the received signal level, reception timing, spreading code sequence, and notification information. The discrimination information has been previously stored in CDMA radio base station device 1.

CDMA radio base station device 1 supplies the generated setting request notification message to radio base station information register 2 through radio base station controller 5, mobile switching center 6, and core network 7.

Mobile switching center 6 is connected to several radio base station controllers including radio base station controller 5. Mobile switching center 6 controls the operation of radio base station controller 5. Mobile switching center 6 is connected to core network 7. Mobile switching center 6 communicates with other mobile switching centers (not shown) and servers (not shown) through core network 7.

Core network 7 is connected to radio base station information register 2. Core network 7 is further connected to public switched telephone networks (PSTN) and Internet 10 through gateways (not shown).

Figure 3:
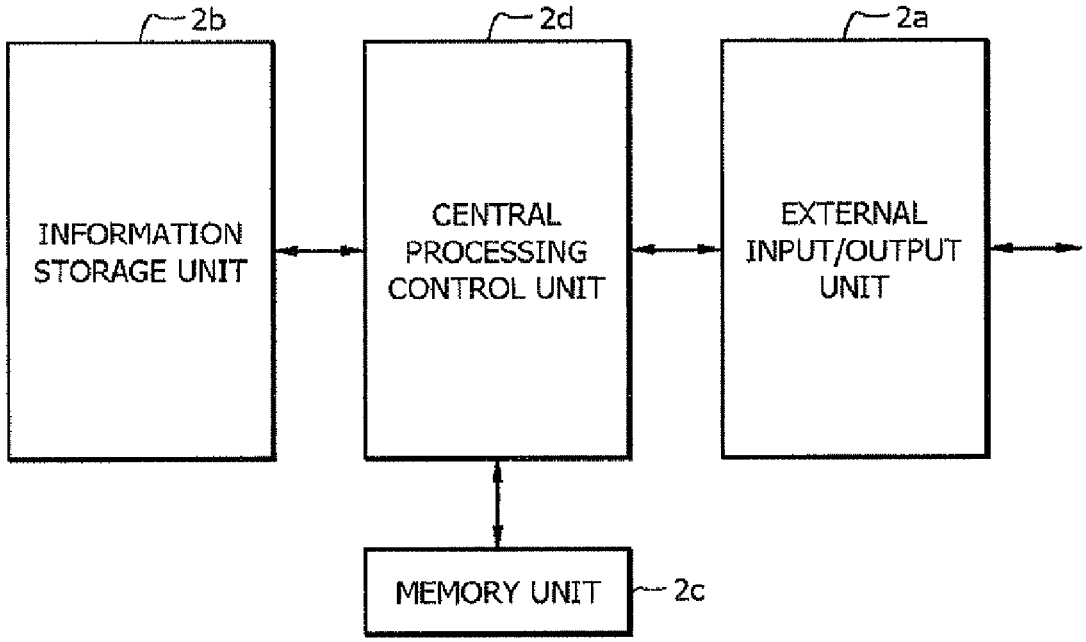
FIG. 3 is a block diagram illustrating an example of a radio base station information register shown in FIG. 1.

Radio base station information register 2 has information storage unit 2b (see FIG. 3). Information storage unit 2b stores identification information for identifying each of existing radio base station devices, the locations of the existing radio base station devices, and communication configurations of the existing radio base station devices in association with one another per the existing radio base station device. Each of the communication configurations includes used frequencies, a cell radius, and a spreading code sequence of each of the existing radio base station device.

Upon receipt of the setting request notification message from CDMA radio base station device 1, radio base station information register 2 determines whether or not identification information for identifying CDMA radio base station device 1, which is indicated by the discrimination information within the setting request notification message, is stored in information storage unit 2b. When the identification information is stored in information storage unit 2b, radio base station information register 2 deletes from information storage unit 2b the identification information as well as the location and the communication configurations stored in association with the identification information.

Subsequently, radio base station information register 2 determines communication configurations for radio base station device 1 based on the setting request notification message and the information stored in information storage unit 2b such that radio base station device 1 is used with a minimum of adverse influence exerted on radio communications of radio base station devices 3 and 4. For example, the communication configurations for radio base station device 1 include a frequency, a spreading code sequence, a maximum signal transmission level, a transmission timing and a cell radius.

Radio base station information register 2 generates a setting information notification message that shows the determined communication configurations. Radio base station information register 2 stores the generated setting information notification message in information storage unit 2b. Subsequently, radio base station information register 2 supplies the generated setting information notification message to CDMA radio base station device 1 through core network 7, mobile switching center 6, and radio base station controller 5.

Control unit 51 of radio base station controller 5 stores the setting information notification message in memory 52 for managing handover of mobile telephone terminal device 8 and for additionally connecting other CDMA radio base station devices. Subsequently, control unit 51 supplies the setting information notification message to CDMA radio base station device 1.

CDMA radio base station device 1 makes basic settings for its CDMA communications based on the setting information notification message supplied thereto. With these settings, CDMA radio base station device 1 can set a radio channel and a logical channel.

Figure 2:
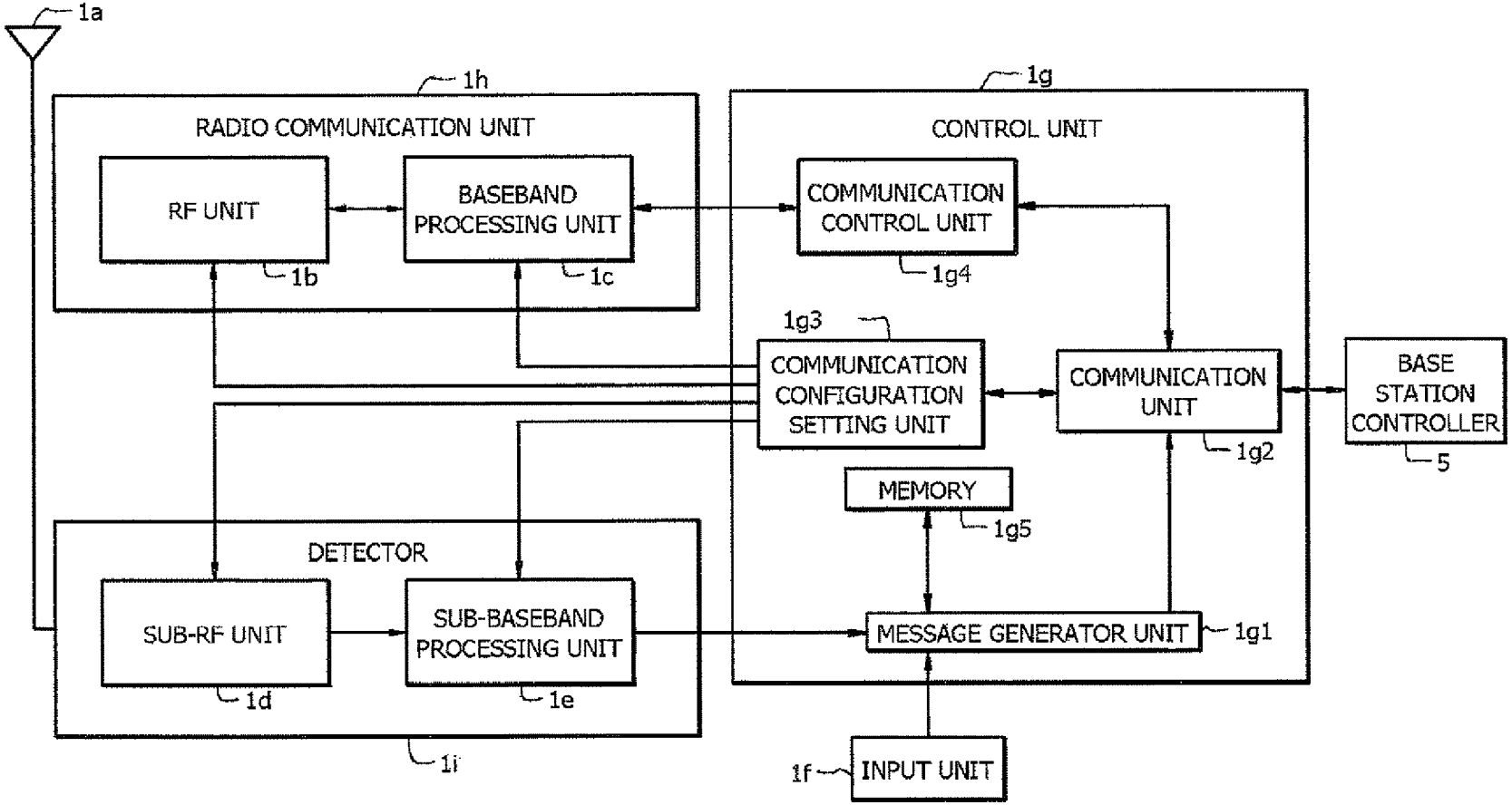
FIG. 2 is a block diagram illustrating an example of a radio base station device shown in FIG. 1.

FIG. 2 is a block diagram illustrating an example of CDMA radio base station device 1.

In FIG. 2, CDMA radio base station device 1 comprises antenna 1a; RF (radio frequency communication) unit 1b; baseband processing unit 1c; sub-RF (radio frequency communication) unit 1d; sub-baseband processing unit 1e; an input unit 1f; and control unit 1g.

Antenna 1a is used to make CDMA-based radio communications with mobile telephone terminal device 8. Antenna la also receives radio signals transmitted from CDMA radio base station devices that are different from CDMA radio base station device 1.

When antenna 1a receives a radio signal transmitted from mobile telephone terminal device 8, RF unit 1b demodulates the received radio signal into a baseband signal. RF unit 1b also modulates a baseband signal destined to mobile telephone terminal device 8, which is supplied from baseband processing unit 1c, into a transmission signal (radio signal). RF unit 1b further controls the transmission power of a radio signal that is transmitted from antenna 1a to mobile telephone terminal device 8. Control unit 1g sets communication configurations for RF unit 1b.

Baseband processing unit 1c digitally processes signals on the radio channel and logical channel. For example, baseband processing unit 1c processes a baseband signal supplied from RF unit 1b into a digital signal. Baseband processing unit 1c supplies the resulting digital baseband signal to control unit 1g. Baseband processing unit 1c also digitally processes a signal for mobile telephone terminal device 8, which is supplied from control unit 1g, in order to generate a baseband signal that will be sent to mobile telephone terminal device 8. Baseband processing unit 1c supplies RF unit 1b with the generated baseband signal that will be sent to mobile telephone terminal device 8. Control unit 1g sets communication configurations for baseband processing unit 1c.

Radio communication unit 1h comprises RF unit 1b and baseband processing unit 1c. Radio communication unit 1h makes radio communication with mobile telephone terminal device 8. Control unit 1g sets communication configurations for radio communication unit 1h. For example, the communication configurations for radio communication unit 1h have a frequency, a spreading code sequence, a cell radius, a maximum signal transmission level, and a transmission timing.

Sub-RF unit 1d allows antenna 1a to receive radio signals of frequencies shown in a different radio base station device information notification message supplied from radio base station controller 5, i.e., sub-RF unit 1d allows antenna 1a to receive radio signals transmitted from other CDMA radio base station devices. Sub-RF unit 1d demodulates a radio signal received by antenna 1a into a baseband signal. Sub-RF unit 1d supplies sub-baseband processing unit 1e with the baseband signal generated through demodulation.

Sub-baseband processing unit 1e despreads the baseband signal supplied from sub-RF unit 1d based on spreading code sequences shown in the different radio base station device information notification message supplied from radio base station controller 5. Sub-baseband processing unit 1e acquires a spreading code sequence using the signal resulting from the despreading. Sub-baseband unit 1e also measures average received power and reception timing of a common pilot channel (CPICH) as defined by 3GPP TS25.211 V5.5.0. Sub-baseband processing unit 1e further decodes a primary common control physical channel (PCCPCH) in order to confirm notification information of other radio base station devices included therein.

Sub-baseband processing unit 1e generates received signal information that includes the average received power and the reception timing of the common pilot channel, the notification information, and the acquired spreading code sequence. Sub-baseband processing unit 1e supplies the generated received signal information to control unit 1g.

Detector 1i comprises sub-RF unit 1d and sub-baseband processing unit 1e. Detector 1i detects a received signal level (distance information), a reception timing (distance information), a spreading code sequence (identification information), and notification information (identification information). Though detector 1i detects two types of distance information according to this embodiment, detector 1i may detect only one type of distance information. Also, though detector 1i detects two types of identification information, detector 1i may detect only one type of identification information.

Input unit 1f accepts a variety of information entered by the user. For example, input unit 1f accepts user preference information entered by the user. The user preference information indicates a desired cell radius of radio base station device 1, and a desired number of terminals connected to radio base station device 1.

Control unit 1g manages the operation of CDMA radio base station device 1. Control unit 1g also has a function of interfacing with radio base station controller 5. Control unit 1g comprises message generator unit 1g1, communication unit 1g2, communication configuration setting unit 1g3, communication control unit 1g4, and memory 1g5.

Memory 1g5 is an example of a discrimination information storage unit. Memory 1g5 previously stores discrimination information indicative of CDMA radio base station device 1.

Message generator unit 1g1 reads the discrimination information of CDMA radio base station device 1 from memory 1g5. Message generator unit 1g1 generates the setting request notification message that shows the received signal information supplied from detector 1i, and the read discrimination information of CDMA radio base station device 1. Message generator unit 1g preferably generates the setting request notification message, which shows the received signal information, discrimination information of CDMA radio base station device 1, and user preference information entered by the user. Also, message generator unit 1g preferably generates the setting request notification message, which shows the received signal information, the discrimination information, and capability information indicative of the communication processing capabilities of radio communication unit 1h. Alternatively, message generator unit 1g1 may generate the setting request notification message, which shows the received signal information, the discrimination information, the capability information, and the user preference information.

According to this embodiment, message generator unit 1g1 generates the setting request notification message, which shows the received signal information, the discrimination information, the capability information, and the user preference information.

The capability information has been previously stored in memory 1g5. Upon generation of the setting request notification message, message generator unit 1g1 reads the capability information together with the discrimination information from memory 1g5.

Communication unit 1g2 is an example of an information transmitter unit. Communication unit 1g2 supplies radio base station information register 2 with the generated setting request notification message through radio base station controller 5, mobile switching center 6, and core network 7. Communication unit 1g2 is also an example of a setting information receiver unit. Communication unit 1g2 receives the setting information supplied from radio base station information register 2.

Communication configuration setting unit 1g3 sets the communication configurations for radio communication unit 1h based on the setting information received by communication unit 1g2. Specifically, communication configuration setting unit 1g3 sets communication configurations (for example, a spreading code sequence) for baseband processing unit 1c, and also sets communication configurations (for example, a frequency, a cell radius, a maximum signal transmission level, and a transmission timing) for RF unit 1b.

Communication control unit 1g4 controls mobile telephone communications between radio communication unit 1h and radio base station controller 5.

FIG. 3 is a block diagram illustrating an example of radio base station information register 2.

In FIG. 3, radio base station information register 2 comprises external input/output unit 2a, information storage unit 2b, memory unit 2c, and central processing control unit 2d.

External input/output unit 2a is an example of an information receiver unit and a communication configuration transmitter unit. External input/output unit 2a receives a setting request notification message supplied from CDMA radio base station device 1.

Information storage unit 2b stores identification information for identifying each of existing radio base station devices, the locations of the existing radio base station devices, and communication configurations for the existing radio base station devices in association with one another for each of existing radio base station devices.

Memory unit 2c is an example of a recording medium that is readable by computer. Memory unit 2c stores a program that defines the operation of radio base station information register 2.

Central processing control unit 2d is an example of a computer. Central processing control unit 2d reads the program stored in memory unit 2c. Central processing control unit 2d executes the read program in order to control the operation of radio base station information register 2. For example, central processing control unit 2d updates information, which is stored in information storage unit 2b, based on a setting request notification message received by external input/output unit 2a. Central processing control unit 2d determines communication configurations for radio communication unit 1i of CDMA radio base station device 1 based on the updated information in information storage unit 2b and the setting request notification message.

Specifically, when information storage unit 2b contains identification information for identifying a radio base station device, which is indicated by discrimination information within the setting request notification message, central processing control unit 2d deletes the identification information as well as the location and communication configurations of the radio base station device stored in association with the identification information from information storage unit 2b. Conversely, when information storage unit 2b does not contain the identification information for identifying a radio base station device, which is indicated by the discrimination information within the setting request notification message, central processing control unit 2d maintains the information stored in information storage unit 2b.

Subsequently, central processing control unit 2d determines communication configurations for radio base station device 1 based on the setting request notification message and the information stored in information storage unit 2b, such that radio base station device 1 is used with a minimum of adverse influence exerted on radio communications of radio base station devices 3 and 4. For example, the communication configurations for radio base station device 1 include a frequency, a spreading code sequence, a maximum signal transmission level, a transmission timing and a cell radius.

Specifically, central processing control unit 2d estimates the location of CDMA radio base station device 1 based on the location of an existing radio base station device stored in information storage unit 2b in association with the identification information received by external input/output unit 2a, and the distance information received by external input/output unit 2a. Then, central processing control unit 2d reads from information storage unit 2b communication configurations for existing radio base station devices installed around the estimated location. Central processing control unit 2d determines communication configurations for radio communication unit 1h based on the read communication configurations for the existing radio base station devices, and the estimated location.

External input/output device 2a supplies CDMA radio base station device 1 with the communication configurations for radio communication unit 1i determined by central processing control unit 2d through core network 7, mobile switching center 6, and radio base station controller 5.

Central processing control unit 2d also stores in information storage unit 2b information on CDMA radio base station device 1 (management ID, ID of radio base station controller 5 which manages CDMA radio base station device 1, used frequency, cell radius, (the number of sectors when CDMA radio base station device 1 is in a multi-sector configuration), spreading code sequence information, maximum signal transmission level, and the like).

Next, the operation will be described.

Figure 4:
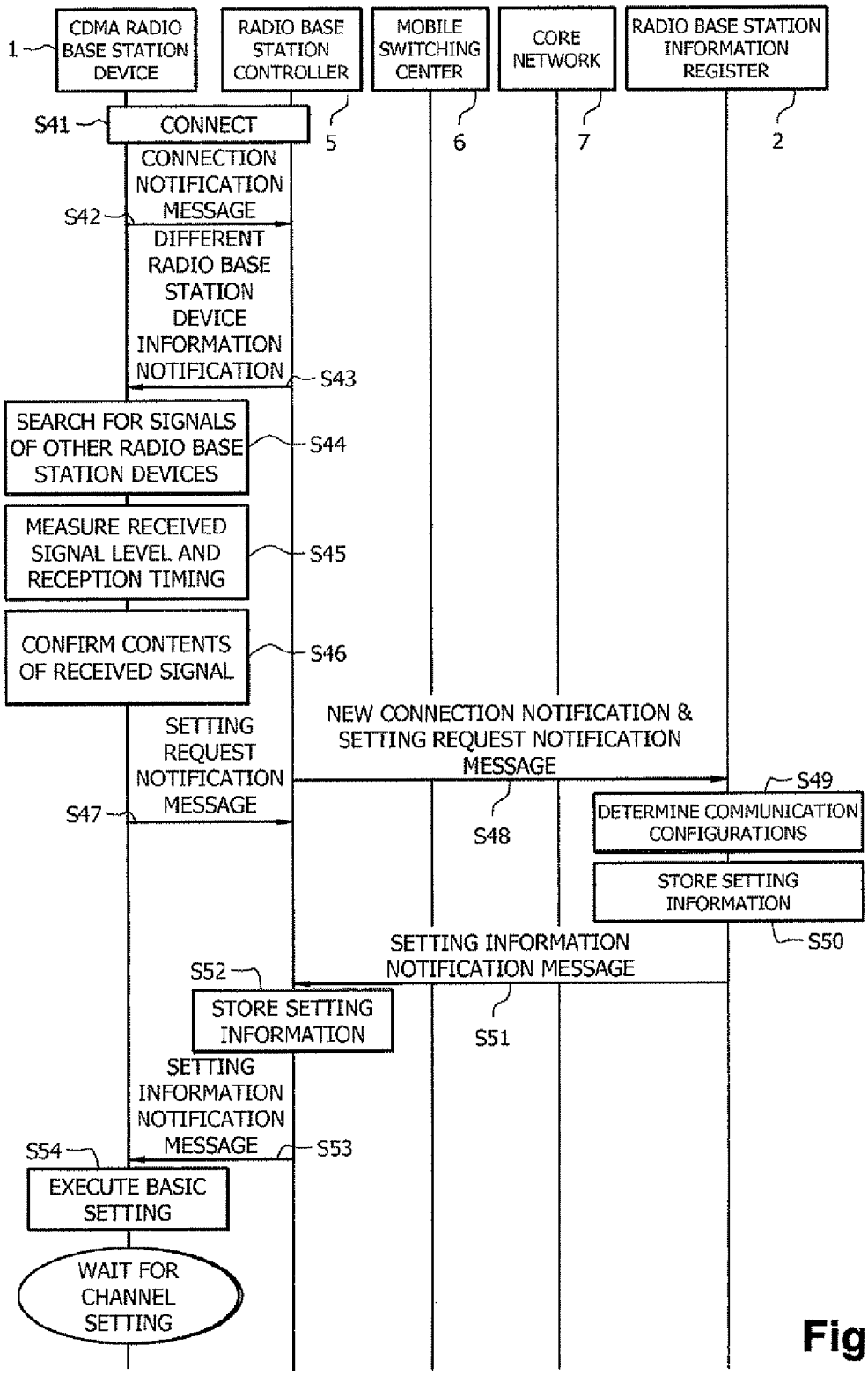
FIG. 4 is a sequence diagram for describing the operation of the radio base station device setting system illustrated in FIG. 1.

FIG. 4 is a sequence diagram for describing the operation of the radio base station device setting system illustrated in FIG. 1. In the following, the operation of the radio base station device setting system illustrated in FIG. 1 will be described with reference to FIG. 4.

At step 41, CDMA radio base station device 1 is connected to radio base station controller 5. There is no particular limitation in the type of a line through which CDMA radio base station device 1 is connected to radio base station controller 5. For example, the type of the line may be wired, wireless, dedicated or Internet. When CDMA radio base station device 1 is connected to radio base station controller 5, CDMA radio base station device 1 executes step 42.

At step 42, message generator unit 1g1 in CDMA radio base station device 1 generates a connection notification message showing that CDMA radio base station device 1 has been connected to radio base station controller 5. Communication unit 1g2 supplies radio base station controller 5 with the connection notification message generated by message generator unit 1g1 in a previously defined protocol and format. Upon receipt of the connection notification message, radio base station controller 5 executes step 43.

At step 43, control unit 51 in radio base station controller 5 reads from memory 52 radio frequencies and spreading code sequences used by CDMA radio base station devices 3 and 4 which have been previously connected to radio base station controller 5. Control unit 51 generates a different radio base station device information notification message that shows the read radio frequencies and spreading code sequences. Control unit 51 transmits the generated different radio base station device information notification message to CDMA radio base station device 1. Upon receipt of the different radio base station device information notification message, CDMA radio base station device 1 executes step 44.

At step 44, when communication unit 1g2 of CDMA radio base station device 1 receives the different radio base station device information notification message, communication configuration setting unit 1g3 sets communication configurations for detector 1i based on the radio frequencies and spreading code sequences shown in the different radio base station device information notification message, such that detector 1i can receive radio signals that are transmitted from CDMA radio base station devices 3 and 4. For example, communication configuration setting unit 1g3 supplies sub-RF unit 1d with the radio frequencies shown in the different radio base station device information notification message, such that sub-RF unit 1d can receive and demodulate radio signals transmitted from CDMA radio base station devices 3 and 4. Further, communication configuration setting unit 1g3 supplies sub-baseband processing unit 1e with the spreading code sequences shown in the different radio base station device information notification message, such that sub-baseband processing unit 1e can despread a signal that is demodulated by sub-RF unit 1d after it has established time synchronization thereto.

CDMA radio base station device 1 executes step 45 after it has terminated step 44. At step 45, sub-RF unit 1d allows antenna 1a to receive radio signals of radio frequencies shown in the different radio base station device information notification message, i.e., sub-RF unit 1d allows antenna 1a to receive radio signals transmitted from other CDMA radio base station devices that are different from CDMA radio base station device 1. Sub-RF unit 1d demodulates a radio signal, which is transmitted from another CDMA radio base station device and received by antenna 1a, into a baseband signal. Sub-RF unit 1d supplies sub-baseband processing unit 1e with the baseband signal generated through the demodulation.

Sub-baseband processing unit 1e despreads the baseband signal, which is supplied from sub-RF unit 1d, based on the spreading code sequences shown in the different radio base station device information notification message. Then, sub-baseband processing unit 1e acquires a spreading code sequence using the signal resulting from despreading. Sub-baseband processing unit 1e further measures average received power and reception timing of a common pilot channel (CPICH) as defined by 3GPP TS25.211 V5.5.0.

Upon termination of step 45, CDMA radio base station device 1 executes step 46. At step 46, sub-baseband processing unit 1e further decodes a primary common control physical channel (PCCPCH) in order to confirm notification information of another radio base station device included therein. Sub-baseband processing unit 1e generates received signal information that includes the average received power and reception timing of the common pilot channel, notification information, and the acquired spreading code sequence. Sub-baseband processing unit 1e supplies the generated received signal information to control unit 1g.

Upon termination of step 46, CDMA radio base station device 1 executes step 47. At step 47, message generator 1g1 generates a setting request notification message. The setting request notification message shows the received signal information supplied from detector 1i, discrimination information of CDMA radio base station device 1 stored in memory 1g5, capability information indicative of the communication processing capabilities of radio communication unit 1h stored in memory 1g5, and user preference information entered by the user. According to this embodiment, the capability information indicates a frequency band over which radio communication unit 1h can emit signals; the number of frequencies that can be simultaneously processed by radio communication unit 1h; the maximum transmission power of radio communication unit 1h; and the number of sectors of radio communication unit 1h. Also, according to this embodiment, the user preference information indicates a desired cell radius, and a desired-number of connected terminals.

Communication unit 1g2 supplies radio base station controller 5 with the setting request notification message generated by message generator unit 1g1. Upon receipt of the setting request notification message from CDMA radio base station device 1, radio base station controller 5 executes step 48. At step 48, radio base station controller 5 supplies the setting request notification message to radio base station information register 2 through mobile switching center 6 and core network 7. The supply of the setting request notification image also serves to notify that CDMA radio base station device 1 has newly been connected to radio base station controller 5 (new connection notification).

Upon receipt of the setting request notification message, radio base station register 2 executes step 49. At step 49, external input/output unit 2a receives the setting request notification message. Central processing control unit 2d updates information stored in information storage unit 2b based on the received setting request notification message. Central processing control unit 2d determines communication configurations for radio communication unit 1i of CDMA radio base station device 1 based on the updated information in information storage unit 2b and the setting request notification message.

For example, when information storage unit 2b contains identification information, which indicates a radio base station device indicated by the discrimination information in the setting request notification message, central processing control unit 2d deletes the identification information, as well as the location of and communication configurations of the existing radio base station device, which are stored in association with the identification information, from information storage unit 2b.

Conversely, when information storage unit 2b does not contain the identification information, which indicates the radio base station device indicated by the discrimination information in the setting request notification message, central processing control unit 2d maintains the information stored in information storage unit 2b.

Subsequently, central processing control unit 2d determines communication configurations for radio base station device 1 based on the setting request notification message and the information stored in information storage unit 2b, such that radio base station device 1 is used with a minimum of adverse influence exerted on radio communications of radio base station devices 3, 4. For example, the communication configurations for radio base station device 1 includes a frequency, a spreading code sequence, a maximum signal transmission level, a transmission timing and a cell radius.

Specifically, central processing control unit 2d first estimates the location of CDMA radio base station device 1 based on the location of the existing radio base station device stored in information storage unit 2b in association with the identification information received by external input/output unit 2a, and the distance information received by external input/output unit 2a. Then, central processing control unit 2d reads from information storage unit 2b communication configurations (radio frequency, cell radius, and spreading code sequence) for existing radio base station devices installed around the estimated location. Central processing control unit 2d determines communication configurations for radio communication unit 1h based on the read communication configurations for existing radio base station devices and the estimated location. In this embodiment, the communication configurations for radio communication unit 1h indicates the frequency, spreading code sequence, cell radius, maximum signal transmission level, and transmission timing.

In the following, description will be given of an exemplary operation for determining the communication configurations for radio communication unit 1h.

Described first is the operation for determining a frequency for radio communication unit 1h.

Central processing control unit 2d confirms a frequency band of radio communication unit 1h (specifically, RF unit 1b) indicated by the capability information. Subsequently, central processing control unit 2d selects radio frequencies, which are used by CDMA radio base station devices adjacent to CDMA radio base station device 1 (according to this embodiment, CDMA radio base stations 3 and 4), from the confirmed frequency band of radio communication unit 1h. Central processing control unit 2d assigns the selected frequencies to frequencies for radio communication unit 1h. With this assignment of the frequency, soft handover can be performed with adjacent cells.

When CDMA radio base station device 1 can simultaneously use a plurality of frequencies, and when a desired number of connected terminals, which are indicated by the user preference information, is larger than a predetermined number, central processing control unit 2d further selects a frequency that is different from the previously assigned frequency from the frequency band of radio communication unit 1h (specifically, RF unit 1b). Central processing control unit 2d also assigns the additionally selected frequency to a frequency for radio communication unit 1h.

Next described is the operation for determining a spreading code sequence for radio communication unit 1h.

Central processing control unit 2d assigns a spreading code sequence, which is not the same as any of the spreading code sequences included in communication configurations for existing radio base station devices installed around CDMA radio base station device 1, as a spreading code sequence for radio communication unit 1h. The communication configurations for the existing radio base station devices, which are installed around CDMA radio base station device 1, are read from information storage unit 2b.

Next described is the operation for determining a cell radius for radio communication unit 1h.

Central control unit 2d determines the radius of a cell for radio communication unit 1h based on the cell radius indicated by the user preference information, the maximum transmission power of radio communication unit 1h (specifically, RF unit 1b) indicated by the capability information, and the radii of cells used by the CDMA radio base station devices adjacent to CDMA radio base station device 1 (according to this embodiment, CDMA radio base station devices 3 and 4).

Next described is the operation for determining a maximum signal transmission level for radio communication unit 1h.

Central processing control unit 2d finds a transmission level at which a radio signal can reach the far end of the cell while maintaining a predetermined quality or higher quality than the predetermined quality, based on the radius of the cell of radio communication unit 1h. Central processing control unit 2d determines the found transmission level as a maximum signal transmission level for signals which can be actually transmitted by CDMA radio base station device 1.

Next described is the operation for determining a transmission timing for radio communication unit 1h.

When CDMA radio base station device 1 has a plurality of sectors, central processing control unit 2d determines an offset value for each sector such that signal transmission timings differ from one sector to another. Specifically, central processing control unit 2d determines an offset value for each sector such that the same offset value will not be used twice among the sectors of CDMA radio base station device 1. By the way, even when CDMA radio base station device 1 has merely one sector, central processing control unit 2d arbitrarily determines offset values.

Upon termination of step 49, radio base station information register 2 executes step 50. At step 50, central processing control unit 2d stores setting information for CDMA radio base station device 1 in information storage unit 2b. The setting information includes the determined communication configurations for CDMA radio base station device 1 (information such as the management ID, ID of radio base station controller 5 which manages CDMA radio base station device 1, used frequency, cell radius, (the number of sectors when CDMA radio base station device 1 has multiple sectors), spreading code sequence information, maximum signal transmission level, and the like).

Upon termination of step 50, external input/output unit 2a of radio base station information register 2 executes step 51. At step 51, external input/output unit 2a supplies radio base station controller 5 with a setting information notification message that shows the determined communication configurations for radio communication unit 1i through core network 7 and mobile switching center 6. Upon receipt of the setting information notification message from radio base station information register 2, control unit 51 of radio base station controller 5 executes step 52. At step 52, control unit 51 stores the setting information notification message in memory 52.

Upon termination of step 52, control unit 51 of radio base station controller 5 executes step 53. At step 53, control unit 51 supplies the setting information notification message to CDMA radio base station device 1. Upon receipt of the setting information notification message, communication unit 1g2 of CDMA radio base station device 1 executes step 54. At step 54, communication unit 1g2 receives the setting information notification message from radio base station information register 2. Communication configuration setting unit 1g3 sets communication configurations for radio communication unit 1h based on the setting information indicated by the received setting information notification message. Specifically, communication configuration setting unit 1g3 sets the communication configuration (spreading code sequence) to baseband processing unit 1c, and also sets the communication configurations (frequency, cell radius, maximum signal transmission level, and transmission timing) to RF unit 1b based on the setting information. With the settings at step 54, CDMA radio base station device 1 transitions to a channel setting waiting state.

According to this embodiment, radio base station information register 2 deletes information on CDMA radio base station 1 (identifying information, location, and communication configurations), which has supplied discrimination information, from information storage unit 2b when such information is stored in information storage unit 2b. Then radio base station information register 2 estimates the location of CDMA radio base station device 1.

Subsequently, radio base station information register 2 reads from information storage unit 2b communication configurations for existing radio base station devices installed around the estimated location. Radio base station information register 2 determines communication configurations for radio communication unit 1h based on the read communication configurations for the existing radio base station devices, and the estimated location.

In this way, radio base station information register 2 can automatically set communication configurations for radio communication unit 1h included in CDMA radio base station device 1 so as not to disable radio communications of other radio base station devices, each time CDMA radio base station device 1 supplies radio base station information register 2 with identification information, distance information, and discrimination information.

Accordingly, even if the user moves CDMA radio base station device 1, CDMA radio base station device 1 can operate in accordance with communication configurations suitable for a location to which it is moved.

Figure 5:
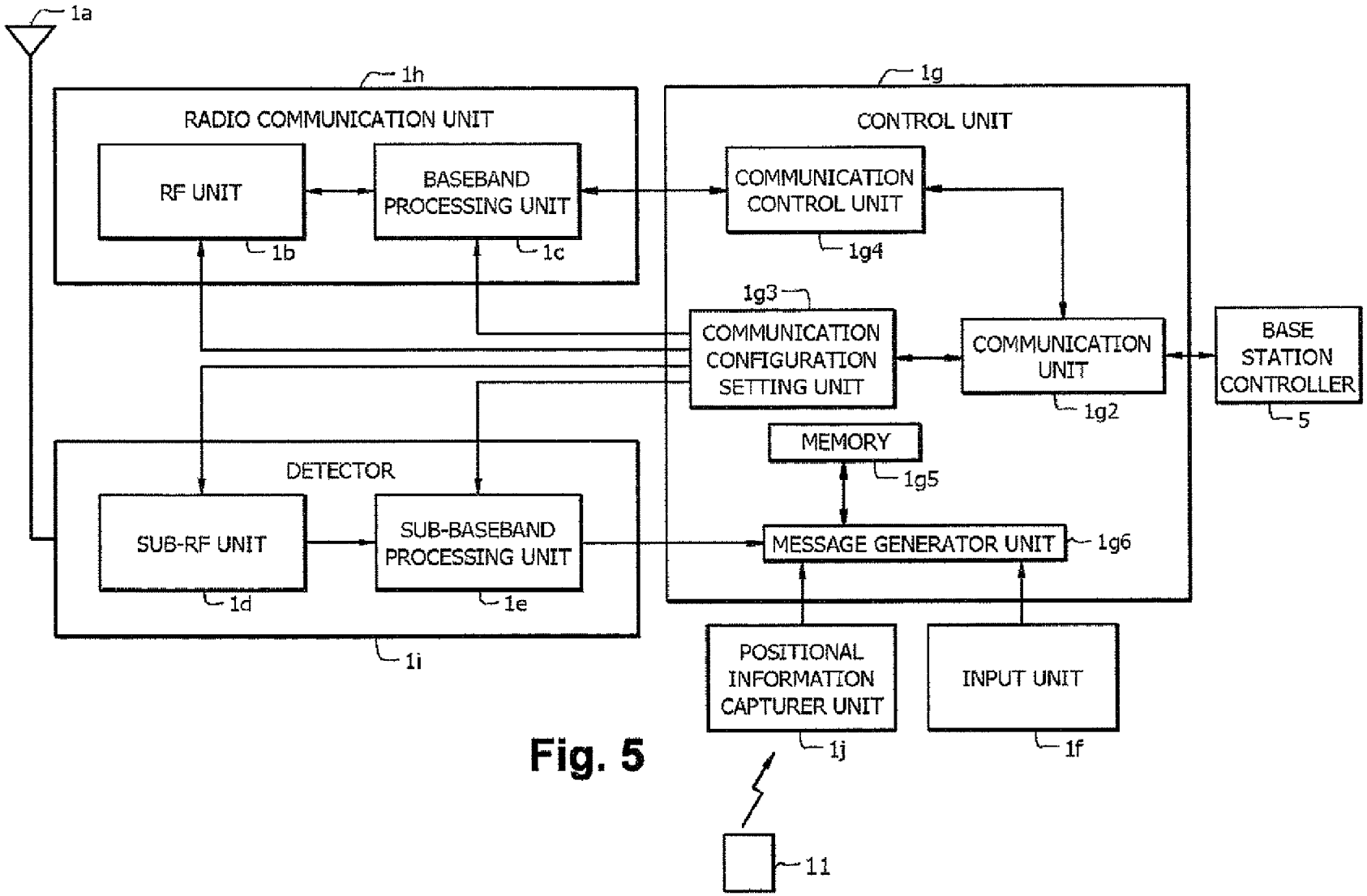
FIG. 5 is a block diagram illustrating another example of the radio base station device shown in FIG. 1.

FIG. 5 is a block diagram illustrating another example of CDMA radio base station device 1. In FIG. 5, the same components as those in FIG. 2 are designated with the same reference numerals.

In FIG. 5, positional information capturer unit 1j captures positional information provided by GPS (Global Positioning System) satellites. This positional information indicates the current position.

Message generator unit 1g6 generates a setting request notification message. The setting request notification message shows received signal information supplied from detector 1i, discrimination information of CDMA radio base station device 1 read from memory 1g5, capability information read from memory 1g5, user preference information entered by the user, and positional information received by positional information capturer unit 1j.

Communication unit 1g2 supplies the generated setting request notification message to radio base station information register 2 through radio base station controller 5, mobile switching center 6, and core network 7.

In this event, central processing control unit 2d of radio base station information register 2 can estimate the location of CDMA radio base station device 1 based on the positional information included in the setting request notification message, in addition to the location estimation in accordance with the foregoing embodiment shown in FIG. 2. Thus, if the location can be estimated based on one of the two types of information, central processing control unit 2d can estimate the location of CDMA radio base station device 1 based on the other one.

When the estimated location in the foregoing embodiment is compared with the positional information from GPS, central processing control unit 2d can estimate the location of the radio base station device with a higher degree of accuracy. It is therefore possible to automatically set communication configurations for a radio communication unit included in a radio base station device in such a manner that the radio communications of other radio base station devices will not fail.

In each of the foregoing embodiments, CDMA radio base station device 1 may periodically measure information such as the received signal level and the reception timing of a radio signal from another radio base station device, and the like, and send the measured information to radio base station information register 2, not only when CDMA radio base station device 1 is connected to radio base station controller 5 but also after CDMA radio base station device 1 has been connected to radio base station controller 5.

In this event, communication configurations can be modified for radio communication unit 1h of CDMA radio base station device 1 under a situation in which CDMA radio base station device 1 is connected to radio base station controller 5. Consequently, the user can move CDMA radio base station device 1 even when it is being used, provided that an instantaneous interruption is allowed in the transmission/reception of signals when communication configurations are modified.

While preferred embodiments of the present invention have been described using specific terms, such description is for illustrative purposes only, and it is to be understood that changes and variations may be made without departing from the spirit or scope of the following claims.

What is claimed is:

1. A radio base station device setting system including a radio base station device, and a radio base station setting device for setting communication configurations for said radio base station device, wherein:

said radio base station device comprises:

a radio communication unit for communicating with mobile communication terminal devices by wireless;

a discrimination information storage unit for storing discrimination information indicative of said radio base station device;

an antenna for receiving a radio signal transmitted from another radio base station device that is different from said radio base station device;

a detector for detecting identification information indicative of said other radio base station device, and distance information indicative of the distance from said other radio base station device to said radio base station device from a radio signal received by said antenna;

a communication unit for supplying said radio base station setting device with the identification information and the distance information detected by said detector together with the discrimination information stored in said discrimination information storage unit, and for receiving setting information supplied from said radio base station setting device; and communication configuration setting unit for setting communication configurations for said radio communication unit based on the setting information received by said communication unit, and said radio base station setting device comprises:

information storage unit for storing identification information for identifying each of existing radio base station devices, locations of the existing radio base station devices, and communication configurations for the existing radio base station of devices in association with one another;

an information receiver unit for receiving the identification information, the distance information, and the discrimination information supplied from said communication unit;

a control unit for deleting from said information storage unit identification information indicated by the received discrimination information, a location and communication configurations stored in said information storage unit in association with the identification information indicated by the received discrimination information, when the identification information indicated by the received discrimination information has been stored in said information storage unit, estimating a location of said radio base station device based on the location stored in said information storage unit in association with the received identification information and the received distance information, and reading from said information storage unit communication configurations for existing radio base station devices installed around the estimated location, and determining communication configurations for said radio communication unit based on the read communication configurations and the estimated location, and storing the determined communication configurations in said information storage unit; and a communication configuration transmitter unit for supplying said radio base station unit with the determined communication configurations as the setting information.

2. The radio base station device setting system according to claim 1, wherein:

said other radio base station device transmits transmission data spread by a spreading code sequence as the radio signal, said system further comprises a radio base station controller for supplying said radio base station device with a radio signal frequency and the spreading code sequence used by said other radio base station device, and said detector detects a spreading code sequence of a radio signal received by said antenna from the received radio signal as the identification information based on the radio signal frequency and the spreading code sequence used by said other radio base station device, supplied from said radio base station controller, and said detector also detects a received signal level and a reception timing of the radio signal as the distance information.

3. The radio base station device setting system according to claim 1, wherein:

said radio base station device further includes an input unit for accepting user preference information from a user, said user preference information indicating desired communication configurations for said radio base station device, wherein said communication unit further supplies said radio base station setting device with the user preference information accepted by said input unit, said information receiver unit further receives the user preference information supplied from said communication unit, and said control unit determines the communication configurations for said radio communication unit based on the read communication configurations for the existing radio base station devices, the estimated location, and the user preference information accepted by said information receiver unit.

4. The radio base station device setting system according to claim 3, wherein:

said communication unit further supplies said radio base station setting device with capability information indicative of communication processing capabilities of said radio communication unit, wherein said information receiver unit further receives the capability information supplied from said communication unit, and said control unit determines the communication configurations for said radio communication unit based on the read communication configurations for the existing radio base station devices, the estimated position, user preference information and the capability information received by said information receiver unit.

5. The radio base station device setting system according to claim 1, wherein:

said communication unit further supplies said radio base station setting device with capability information indicative of communication processing capabilities of said radio communication unit, wherein said information receiver unit further receives the capability information supplied from said communication unit, and said control unit determines the communication configurations for said radio communication unit based on the read communication configurations for the existing radio base station devices, the estimated location, and the capability information received by said information receiver unit.

6. The radio base station device setting system according to claim 1, wherein:

said radio base station device further includes a positional information capturer unit for capturing positional information indicative of a current position supplied by GPS satellites, wherein said communication unit further supplies said radio base station setting device with the positional information captured by said positional information capturer unit, said information receiver unit further receives the positional information supplied from said communication unit, and said control unit estimates the location of said radio base station device based on the location of the existing radio base station devices stored in said information storage unit in association with the identification information received by said information receiver unit, the distance information received by said information receiver unit, and the positional information received by said information receiver unit.

7. A radio base station device setting method performed by a radio base station device setting system, said system including a radio base station device including a radio communication unit for communicating with mobile communication terminal devices by wireless, and a discrimination information storage unit for storing discrimination information indicative of said radio base station device, and a radio-base station setting device including an information storage unit for storing identification information for identifying each of existing radio base station devices, locations of said existing radio base station devices, and communication configurations for said existing radio base station devices in association with one another, said method comprising:

a radio signal receiving step in which said radio base station device receives a radio signal transmitted from another radio base station device that is different from said radio base station device;

a detecting step in which said radio base station device detects identification information indicative of said other radio base station device, and distance information indicative of the distance from said other radio base station device to said radio base station device, said information being detected from the radio signal;

a supplying step in which said radio base station device supplies said radio base station setting device with the detected identification information and distance information together with the discrimination information stored in said discrimination information storage unit;

an information receiving step in which said radio base station setting device receives the supplied identification information, distance information, and discrimination information;

a controlling step in which said radio base station setting device deletes from said information storage unit identification information for identifying an existing radio base station device indicated by the received discrimination information, and a location and communication configurations of the existing radio base station device stored in said information storage unit in association with the identification information indicated by the received discrimination information, when the identification information has been stored in said information storage unit, estimates a location of said radio base station device based on the location of the existing radio base station device stored in said information storage unit in association with the received identification information and the received distance information, reads communication configurations for existing radio base station devices installed around the estimated location from said information storage unit, determines communication configurations for said radio communication unit based on the read communication configurations of the existing radio base station devices and the estimated location, and stores the determined communication configurations in said information storage unit;

a communication configuration transmitting step in which said radio base station setting device supplies the determined communication configurations to said radio base station device as setting information;

a setting information receiving step in which said radio base station device receives the supplied setting information; and a communication configuration setting step in which said radio base station device sets the communication configuration for said radio communication unit based on the received setting information.

8. The radio base station device setting method according to claim 7, wherein:

said other radio base station device transmits transmission data spread by a spreading code sequence as the radio signal, said radio base station device setting system further comprises a radio base station controller for supplying said radio base station device with a radio signal frequency and the spreading code sequence used by said other radio base station device, and said detecting step includes detecting a spreading code sequence of a radio signal received by said antenna from the received radio signal as the identification information based on the radio signal frequency and spreading code sequence used by said other radio base station device, supplied from said radio base station controller, and detecting a received signal level and a reception timing of the radio signal as the distance information.

9. The radio base station device setting method according to claim 7, further comprising:

an entering step in which said radio base station device accepts user preference information from a user, said user preference information indicating desired communication configurations for said radio base station device, said supplying step further includes supplying the accepted user preference information to said radio base station setting device, said information receiving step further includes receiving the supplied user preference information, and said controlling step includes determining the communication configurations for said radio communication unit based on the read communication configurations for the existing radio base station devices, the estimated location, and the accepted user preference information.

10. The radio base station device setting method according to claim 9, wherein:

said supplying step further includes supplying said radio base station setting device with capability information indicative of communication processing capabilities of said radio communication unit, said information receiving step further includes receiving the supplied capability information, and said controlling step includes determining the communication configurations for said radio communication unit based on the read communication configurations for the existing radio base station devices, the estimated position, the received user preference information, and the received capability information.

11. The radio base station device setting method according to claim 7, wherein:

said supplying step further includes supplying said radio base station setting device with capability information indicative of communication processing capabilities of said radio communication unit, said information receiving step further includes receiving the supplied capability information, and said controlling step includes determining the communication configurations for said radio communication unit based on the read communication configurations for the existing radio base station devices, the estimated location, and the received capability information.

12. The radio base station device setting method according to claim 7, further comprising:

a positional information intercepting step in which said radio base station device captures positional information indicative of a current position supplied by GPS satellites, wherein:

said supplying step further includes supplying the captured positional information to said radio base station setting device, said information receiving step further includes receiving the supplied positional information, and said controlling step includes estimating the location of said radio base station device based on the location of the existing radio base station device stored in said information storage unit in association with the identification information, the received distance information, and the received positional information.

*13. A radio base station device setting system including a radio base station device, and a radio base station setting device that sets communication configurations for said radio base station device, wherein:*

*said radio base station device comprises:*

*a radio communication unit that communicates with mobile communication terminal devices by wireless, and*

*a positional information capturer unit that captures positional information indicative of the current position of said radio base station device,*

*said radio base station setting device comprises:*

*an information receiver unit that receives said positional information and received signal information, which indicates received signals from existing radio base station devices around said radio base station device, that are supplied from said radio base station device,*

*an information storage unit that stores communication configurations of existing radio base station devices around said radio base station device,*

*a control unit that reads said communication configurations of existing radio base station devices around said radio base station device from said information storage unit, determines communication configurations for said radio communication unit based on said communication configurations of existing radio base station devices and said positional information and said received signal information, and stores the determined communication configurations in said information storage unit, and*

*a communication configuration transmitter unit that supplies said radio base station unit with said determined communication configurations as setting information.*

*14. A radio base station device setting method performed by a radio base station device setting system, said system including a radio base station device including a radio communication unit for communicating with mobile communication terminal devices by wireless, and a radio base station setting device including an information storage unit that stores communication configurations of existing radio base station devices around said radio base station device and supplying said radio base station device with communication configurations, comprising:*

*a supplying step in which said radio base station device supplies said radio base station setting device with positional information acquired from a position-measuring device and with received signal information which indicates received signals from existing radio base station devices around said radio base station device,*

*a receiving step in which said radio base station setting device receives said positional information from said radio base station device,*

*a reading step in which said radio base station setting device reads communication configurations of existing radio base station devices around said radio base station device from said information storage unit,*

*a determining step in which said radio base station setting device determines communication configurations for said radio communication unit based on said communication configurations of existing radio base station devices and said positional information and said received signal information, and stores said determined communication configurations in said information storage unit, and*

*a communication configuration transmitting step in which said radio base station setting device supplies said radio base station device with said determined communication configurations as setting information.*

* * * * *